United States Patent [19]

Komatsu

[11] Patent Number: 5,233,829
[45] Date of Patent: Aug. 10, 1993

[54] EXHAUST SYSTEM FOR INTERNAL COMBUSTION ENGINE

[75] Inventor: Kazunari Komatsu, Hiroshima, Japan

[73] Assignee: Mazda Motor Corporation, Hiroshima, Japan

[21] Appl. No.: 917,263

[22] Filed: Jul. 23, 1992

[30] Foreign Application Priority Data

Jul. 23, 1991 [JP] Japan .................. 3-207473

[51] Int. Cl.⁵ .................................. F01N 3/28
[52] U.S. Cl. ........................... 60/276; 60/277; 60/285; 123/691; 123/692
[58] Field of Search ............ 60/276, 277, 285; 123/691, 692

[56] References Cited

U.S. PATENT DOCUMENTS 4,622,809 11/1986 Abthoff ........................ 60/276
5,074,113 12/1991 Matsuoka ..................... 60/276

FOREIGN PATENT DOCUMENTS 63-97852 4/1988 Japan .
64-8332 1/1989 Japan .
31544 2/1991 Japan ........................... 123/692

Primary Examiner—Douglas Hart
Attorney, Agent, or Firm—Keck, Mahin & Cate

[57] ABSTRACT

In an exhaust system for an internal combustion engine, including an upstream catalytic converter and a downstream catalytic converter, emission levels of exhaust gas are detected at positions upstream from the upstream catalytic converter, between the upstream and downstream catalytic converters, and downstream from the downstream catalytic converter, respectively. An air-fuel ratio is feedback controlled based on an emission level detected by the first emission sensor or feedback controlled based on an emission level detected by the second emission sensor when the engine operates in a specific vehicle operating condition. Deterioration of the downstream catalytic converter is detected based on an emission level detected by the third emission sensor while an air-fuel ratio is feedback controlled based on the emission level detected by the second emission sensor.

9 Claims, 6 Drawing Sheets

EXHAUST SYSTEM FOR INTERNAL COMBUSTION ENGINE

BACKGROUND OF THE INVENTION

1. Field of the Invention

This invention relates to an exhaust system for an internal combustion engine and, more particularly, to an exhaust system for purifying exhaust gases for an internal combustion engine.

Typically, an exhaust system is endowed with an exhaust gas purifying catalytic converter located in an exhaust pipe downstream from the engine and an exhaust sensor located upstream from the catalytic converter for detecting an oxygen emission level in the exhaust gas. The oxygen emission level is used to feedback control an actual air-fuel ratio of a fuel mixture supplied to the combustion chamber so that it approaches a target air-fuel ratio.

2. Description of Related Art

Devices which are known as "three-way" catalytic converters, including rhodium, are typically used in conjunction with an internal combustion engine to eliminate harmful emissions which can pose health problems from engine exhaust. Particular emissions which ar typically eliminated include carbon monoxide (CO), hydrocarbons (HC) and nitrous oxides (NOx). Such a catalytic converter is located in an exhaust line downstream from an engine combustion chamber. In order to assure functional efficiency of the catalytic converter, the air-fuel ratio of a fuel mixture supplied to the combustion chamber is controlled so that it is maintained at a target air-fuel ratio, e.g., a theoretical air-fuel ratio, of 14.7. In order to conduct the air-fuel ratio control, an exhaust sensor is conventionally located upstream from the catalytic converter. The exhaust sensor provides an output signal which varies in output level before and after an excessive air supply rate is determined to be present. The air supply rate is defined as the ratio of an actual air-fuel ratio to a theoretical air-fuel ratio. An excessive air supply rate is considered to exist when the air supply rate exceeds the value of 1. Restoration of an air-fuel ratio to the theoretical or target air/fuel ratio is performed by decreasing a quantity of fuel supplied when the exhaust sensor detects an air-fuel ratio indicative of a rich fuel mixture. Conversely, such restoration is performed by increasing a quantity of fuel supplied when the exhaust sensor detects an air-fuel ratio indicative of a lean fuel mixture.

A three-way catalyst used in the catalytic converter functionally deteriorates due to impurities in, for example, a leaded gasoline. The impurities typically adhere to the catalytic components even in the insured period of its useful life. Such impurities cause changes in performance during time passage which are taken into consideration in determining the insured period. Functional deterioration of a catalytic converter can be indirectly detected from the number of reversals of output signals from an exhaust sensor, provided downstream from the catalytic converter so as to detect an oxygen level in the exhaust gas, while air-fuel feedback control is conducted based on the output from the exhaust sensor. This is based on the fact that functional deterioration of a catalytic converter is evidenced by the presence of little difference between the concentration of oxygen upstream from the catalytic converter and the concentration of oxygen downstream from the catalytic converter, owing to an reduction in oxygen adsorbability of the catalytic converter. Such a way of detecting deterioration of a catalytic converter in an exhaust system is known from, for instance, Japanese Unexamined Patent Publication No. 63-97,852.

Some exhaust systems of this kind are provided with two catalytic converters located upstream and downstream from one another in order to enhance exhaust purification ability at low temperatures. Such an exhaust system is known from, for instance, Japanese Unexamined Patent Publication No. 64-8,332. In such an exhaust system, in which two catalytic converters are provided upstream and downstream relative to one another, if an exhaust sensor is only placed downstream from the downstream catalytic converter to detect functional deterioration of the catalytic converter on the basis of changes in signal output level from the exhaust sensor, the actual deterioration of each of the catalytic converters cannot be accurately ascertained, owing to differences in quality of the exhaust gases which act on each of the respective upstream and downstream catalytic converters. Consequently, the level of deterioration of each of the catalytic converters will also differ.

Consideration has been given to placing a exhaust sensor between the upstream and downstream catalytic converters to detect functional deterioration of the upstream catalytic converter. However, since greater oxygen adsorption occurs in both the upstream and downstream catalytic converters as compared to an exhaust system equipped with a single catalytic converter, if air-fuel ratio feedback control is conducted based on an output from the exhaust sensor located upstream from the upstream catalytic converter, little change in oxygen pressure in the exhaust gases downstream from the downstream catalytic converter is shown. Accordingly, unless there is a significant functional deterioration of the downstream catalytic converter, the exhaust sensor downstream from the downstream catalytic converter will not have any noticeable change produced in its output signal level. As a result, the accuracy with which functional deterioration is detected is lowered. This is particularly true for the exhaust sensor downstream from the other exhaust sensor.

SUMMARY OF THE INVENTION

One object of this invention is to provide an exhaust system for an internal combustion engine which is designed to detect functional deterioration of catalytic converters located upstream and downstream from each other in the exhaust line.

It is another object of the invention to provide an exhaust system for an internal combustion engine which is designed, in particular, to properly detect functional deterioration of a catalytic converter located downstream from another catalytic converter.

These objects are accomplished by providing a particular exhaust system for an internal combustion engine. The exhaust system has an exhaust line which is provided with upstream catalytic converters of purifying exhaust gas and a downstream catalytic converter, disposed downstream from the upstream catalytic converters, for further purifying exhaust gas. Emission levels of, for instance, oxygen in exhaust gas in the exhaust line is detected by first, second and third emission sensors disposed, respectively, upstream from at least one of the upstream catalytic converters, between the at least one of the upstream catalytic converters and the downstream catalytic converter, and downstream from the downstream catalytic converter. A control unit is provided for feedback controlling an air-fuel ratio for the engine based on an emission level detected by the first emission sensor. The control unit detects deterioration of the downstream catalytic converter based on an emission level detected by the third emission sensor while an air fuel ratio is feedback controlled based on the emission level detected by the second emission sensor. This air-fuel ratio feedback control is conducted only when the vehicle operates in a specific vehicle operating condition.

Specifically, the degree of deterioration of the downstream catalytic converter is determined based on a ratio between reversal frequencies of signals representative of emission levels provided from the second and third emission sensors. When a ratio higher than a predetermined value is detected, a critical deterioration of the downstream catalytic converter is determined to be present.

Similarly, deterioration of the at least one upstream catalytic converter is determined based on an emission level detected by the second emission sensor. An air fuel ratio is feedback controlled based on an emission level detected by the first emission sensor when the ratio is lower than a predetermined value.

During determination of the degree of deterioration of the downstream catalytic converter, air-fuel ratio feedback control is accomplished on the basis of an emission level of, for instance, oxygen in exhaust gas detected by the second exhaust sensor located between the upstream and downstream catalytic converters. As a result, the determination of deterioration of the downstream catalytic converter is carried out without having a considerable excess or lack of oxygen immediately upstream of the downstream catalytic converter. This enables an accurate detection of deterioration of the downstream catalytic converter and permits accurate air-fuel ratio feedback control to be accomplished ordinarily on the basis of an emission level of oxygen detected by the first exhaust sensor, which is located upstream from one of the upstream catalytic converters.

BRIEF DESCRIPTION OF THE DRAWINGS

The above and other objects and features of the present invention will be apparent to those skilled in the art from the following description of a preferred embodiment thereof when considered in conjunction with the appended drawings. Similar reference numerals have been used to denote the same or similar elements throughout the drawings.

DETAILED DESCRIPTION OF THE PREFERRED EMBODIMENT

Figure 1:
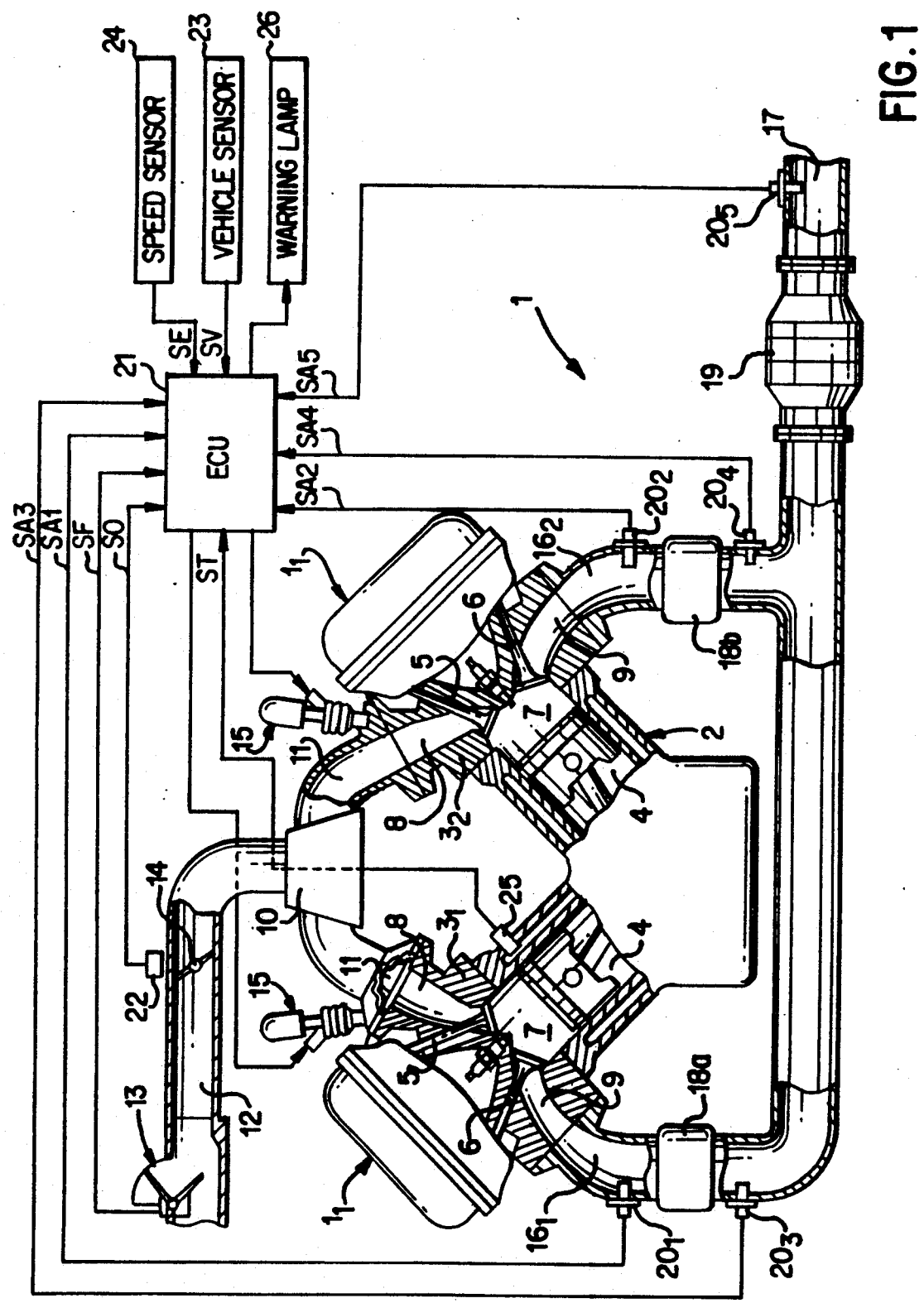
FIG. 1 is a schematic illustration of a V-type internal combustion engine equipped with an exhaust system in accordance with a preferred embodiment of the present invention.

Referring to the drawings in detail and, in particular, to FIG. 1, a V-type internal combustion engine 1 equipped with an exhaust system in accordance with a preferred embodiment of the present invention is shown. The engine 1 includes a pair of, i.e., left and right, cylinder banks $1_1$ and $1_2$ arranged in a V-formation and at a predetermined relative angle. The engine 1 is provided with a row of cylinders 4 in the left cylinder bank $1_1$ and a row of cylinders 4 in the right cylinder bank $1_2$. Additionally, the engine 1 has a cylinder block 2. A left cylinder head $3_1$ is mounted on the cylinder block 2 and provides for the left cylinder bank $1_1$ and a right cylinder head $3_2$ is mounted on the cylinder block 2 and provides for the right cylinder bank $1_2$.

Cylinders 4 of the left and right cylinder head $3_1$ and $3_2$, respectively, are provided with intake ports 8. Further, the cylinders 4 of the left and right cylinder head $3_1$ and $3_2$ are, respectively, provided with exhaust ports 9. The intake ports 8 and the exhaust ports 9 open into the combustion chambers 7 and are opened and shut at a predetermined timing by intake valves 5 and exhaust valve 6, respectively. Intake air is introduced into the cylinders 4 through left and right branch intake pipes 11, branching off from a surge tank 10, via the intake ports 8.

The intake system of the engine is endowed with a common upstream intake pipe 12 connected to the surge tank 10. The common upstream intake pipe 12 is provided with an air flow sensor 13 for detecting an air flow rate and a throttle valve 14 for regulating the amount of intake air and hence the engine output. Each branch intake pipe 11 is provided with a fuel injection valve 15 located at a downstream portion thereof. The exhaust system of engine 1 is endowed with a pair of upstream exhaust manifold pipes $16_1$ and $16_2$, which extend from the exhaust ports 9, respectively, and a common downstream exhaust pipe 17, into which the upstream exhaust pipes $16_1$ and $16_2$ converge. The common downstream exhaust pipe 17 is provided with a primary catalytic converter 19 for purifying exhaust gas. Each upstream exhaust pipe $16_1$ or $16_2$ is provided with a secondary catalytic converter 18a or 18b. Each of the secondary catalytic converters is smaller in capacity than the main catalytic converter 19 and purifies exhaust gas.

Upstream from the catalytic converters 18a and 18b, exhaust sensors $20_1$ and $20_2$ are respectively disposed in the upstream exhaust pipes $16_1$ and $16_2$. These exhaust sensors detect the emission level of residual oxygen in exhaust gases. Downstream from the respective catalytic converters 18a and 18b, there are provided exhaust sensors $20_3$ and $20_4$ in the respective upstream exhaust pipes $16_1$ and $16_2$. These exhaust sensors $20_3$ and $20_4$ detect the emission level of residual oxygen in exhaust gases. The sensors $20_1$-$20_4$. are otherwise denoted as an A sensor, a B sensor, a C sensor and a D sensor for simplicity. Downstream from the primary catalytic converter 19, there is provided an exhaust sensor $20_5$, otherwise denoted as an E sensor. The E sensor is provided in the downstream exhaust pipe 17, and detects the emission level of residual oxygen in exhaust gases.

Air-fuel ratio feedback control is performed by a electric control unit (ECU) 21 incorporated in the engine 1. The electric control unit (ECU) 21 also determines functional deterioration of the catalytic converters. The electronic control unit (ECU) 21 receives various signals, such as an air flow rate signal SF from the air flow sensor 13 representative of an air flow rate, a throttle opening signal ST from the throttle opening sensor 22 representative a throttle opening of the throttle valve 14, a vehicle speed signal SV from a speed sensor 23 representative of a vehicle speed, an engine speed signal SE from an engine speed sensor 24 representative of an engine speed in r.p.m., a temperature signal ST from a temperature sensor 25 representative of the temperature of engine coolant, and emission level signals SA1-SA5 from the A-E sensors representative, respectively, of emission levels of residual oxygen in exhaust gas. The air-fuel ratio control and the deterioration detection or determination are executed based on these signals. In addition, the electronic control unit (ECU) 21 controls warning lamp 26 to signal critical deterioration of the secondary catalytic converters 18a and 18b, as well as critical deterioration of the primary catalytic converter 19.

Air-fuel ratio control is accomplished as the electronic control unit (ECU) 21 reads each signal. The electronic control unit (ECU) 21 calculates the amount of air to be supplied into the combustion chamber 7 for each cycle based on an air flow rate signal AF and an engine speed signal SE. Subsequently, the electronic control unit (ECU) 21 calculates, based on the calculated amount of air, a basic fuel injection rate at which the fuel injection valve 15 injects fuel into the combustion chamber 7. Thereafter, the electronic control unit (ECU) 21 decides whether or not the engine is put in engine operating conditions for the air-fuel ratio feedback control. That is, the air-fuel feedback condition is fulfilled when the engine operates in a specific engine operating range defined by throttle opening, which represents engine load, and engine speed, and in a specific range of cooling water temperatures higher than a predetermined temperature. If in fact the engine 1 operates in both the specific ranges, the electronic control unit (ECU) 21 controls the fuel injection valves 15 so that the optimal air-fuel ratio is achieved for each row of the cylinders 4 of the left and right cylinder banks $1_1$ and $1_2$.

Air-fuel feedback control is executed for, for example, the left cylinder bank $1_1$ in such a manner that the electronic control unit (ECU) 21 sets a feedback correction value $C_{FB}$ for an increase in fuel injection rate when an emission level signal SA1 from the exhaust sensor $20_1$ indicates a leaner air-fuel ratio. The electronic control unit (ECU) 21 also sets the feedback correction value $C_{FB}$ for a decrease in fuel injection rate when an emission level signal SA1 from the exhaust sensor $20_1$ indicates a richer air-fuel ratio. An actual fuel injection rate is determined after a correction of the basic fuel injection rate by the feedback correction value $C_{FB}$ and the temperature of cooling water. The electronic control unit (ECU) 21 provides an injection signal corresponding to the actual fuel injection rate to the fuel injection valves 15 for the row of the cylinders 4 in the left cylinder bank $1_1$.

Figure 2:
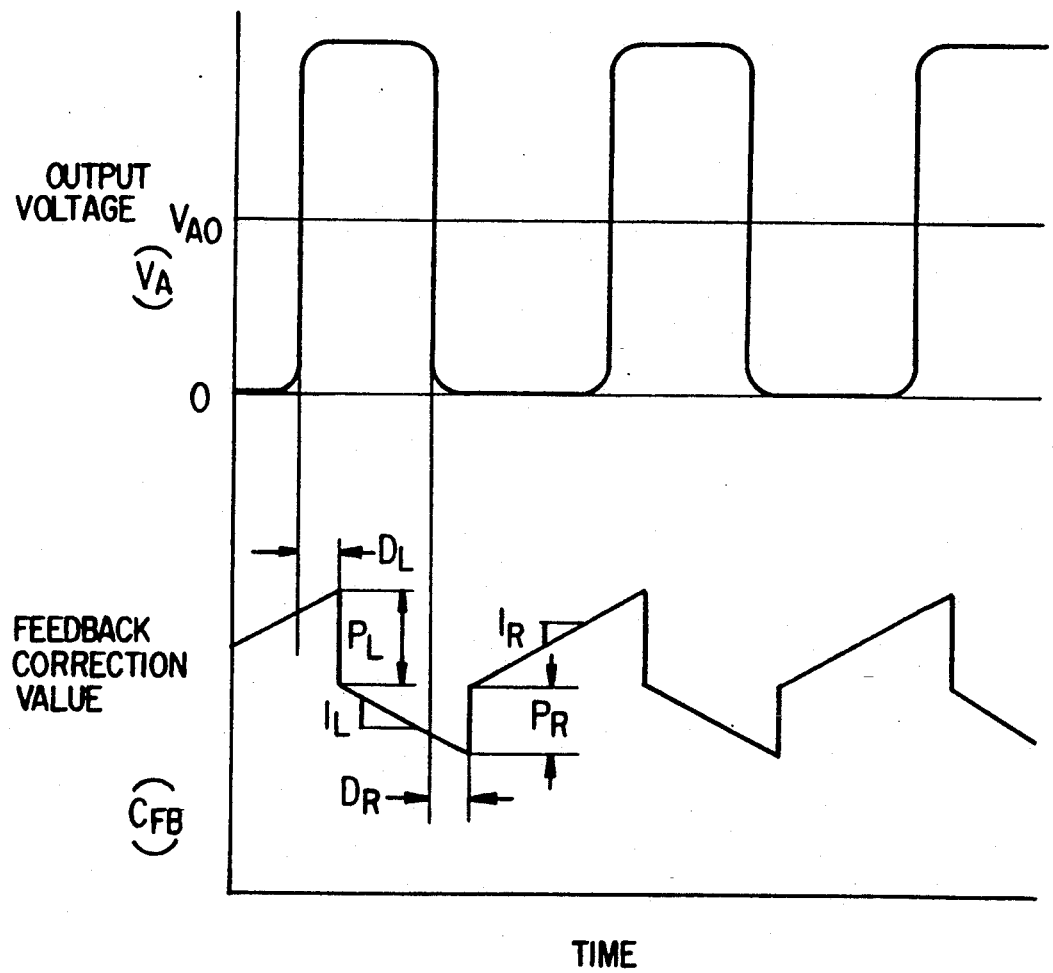
FIG. 2 is a time chart showing correction value for normal feedback control.

FIG. 2 shows how to determine a feedback correction value $C_{FB}$ based on an output voltage $V_A$ of the A sensor $20_1$. An air-fuel ratio is determined to have turned from lean to rich when an output voltage $V_A$ of the A sensor $20_1$ becomes greater than a predetermined basic voltage $V_{A0}$. When such a determination is made, a feedback correction value $C_{FB}$ at the determination is then continuously changed stepwise by increments of a predetermined rich integration constant $I_R$ for making the air-fuel ratio rich for a period defined by a predetermined delay constant $D_L$. After the period determined by the lean delay constant $D_L$ has elapsed, a rapid decrease in the feedback correction value $C_{FB}$, by a predetermined lean skip value $P_L$, is caused. The feedback correction value $C_{FB}$ is then continuously changed stepwise by decrements of a predetermined lean integration constant $I_L$ for making the air-fuel ratio lean. When output voltage $V_A$ of the A sensor $20_1$ becomes lower than the basic voltage $V_{A0}$, it is determined that the air-fuel ratio has changed from rich to lean. The feedback correction value $C_{FB}$ at the determination is then continuously changed stepwise by increments of the lean integration constant $I_L$ for making the air-fuel ratio rich for a period defined by a predetermined rich delay constant $D_R$. After the period determined by the rich delay constant $D_R$ has elapsed, a rapid increase in feedback correction value $C_{FB}$ by a predetermined rich skip value $P_R$ is caused. The feedback correction value $C_{FB}$ is then continuously changed stepwise by increments of the predetermined rich integration constant $I_R$ in order to make the air-fuel ratio rich.

On the other hand, when the electronic control unit (ECU) 21 detects that the engine is operating under engine operating conditions for the air-fuel ratio feedback control, an open loop fuel injection control is conducted so as to cause the fuel injection valve 15 to inject an appropriate amount of fuel read out from a fuel injection map. This appropriate fuel amount is determined by a throttle opening, an engine speed, and a temperature of the engine coolant.

For the right cylinder bank $1_2$, the electronic control unit (ECU) 21 accomplishes feedback control for the air-fuel ratio based on an output signal of the B sensor $20_2$ while meeting other the specified engine operating conditions for the air-fuel ratio feedback control.

Figure 3:
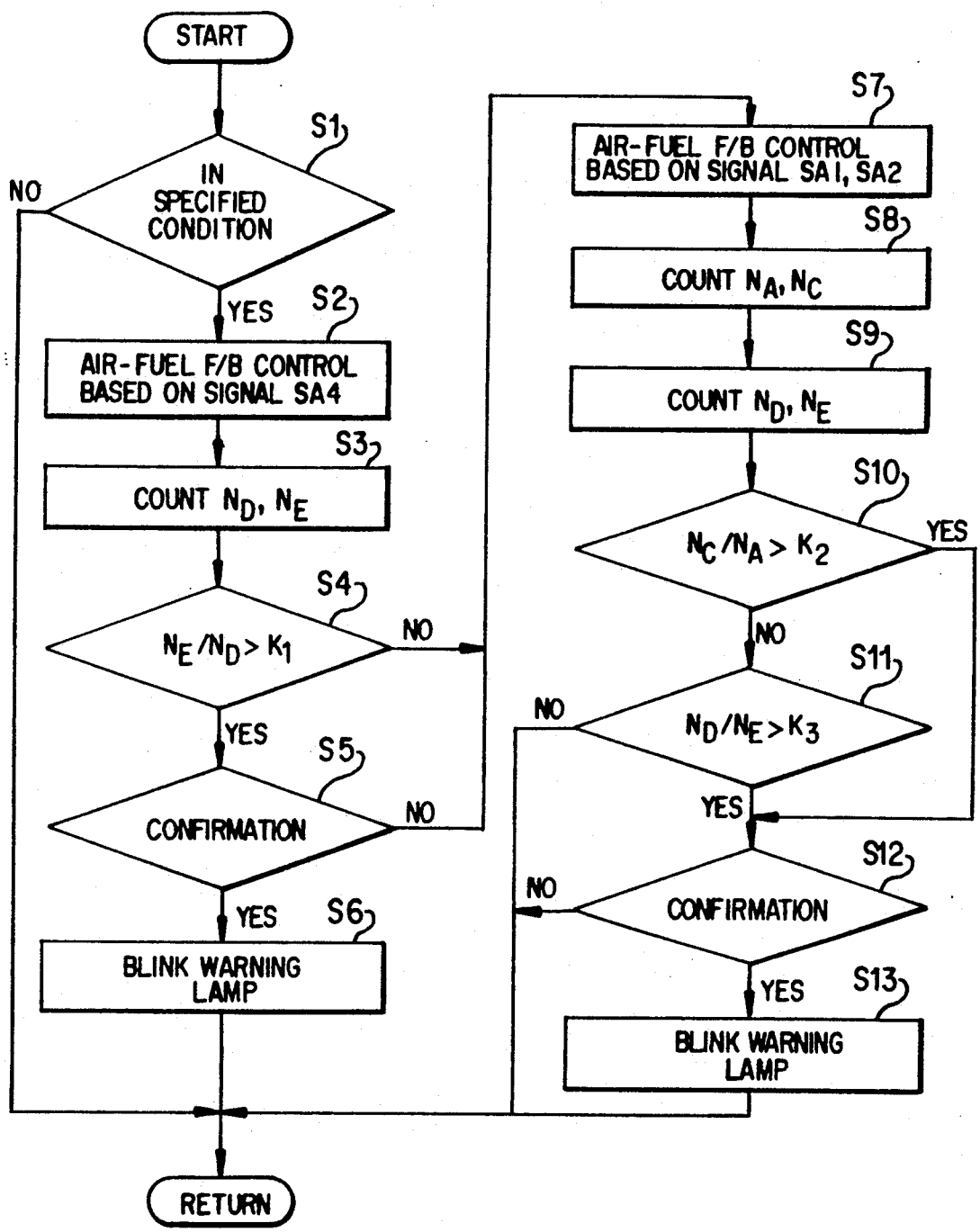
FIG. 3 is a flow chart illustrating a determination of deterioration of a catalytic converter.
Figure 4:
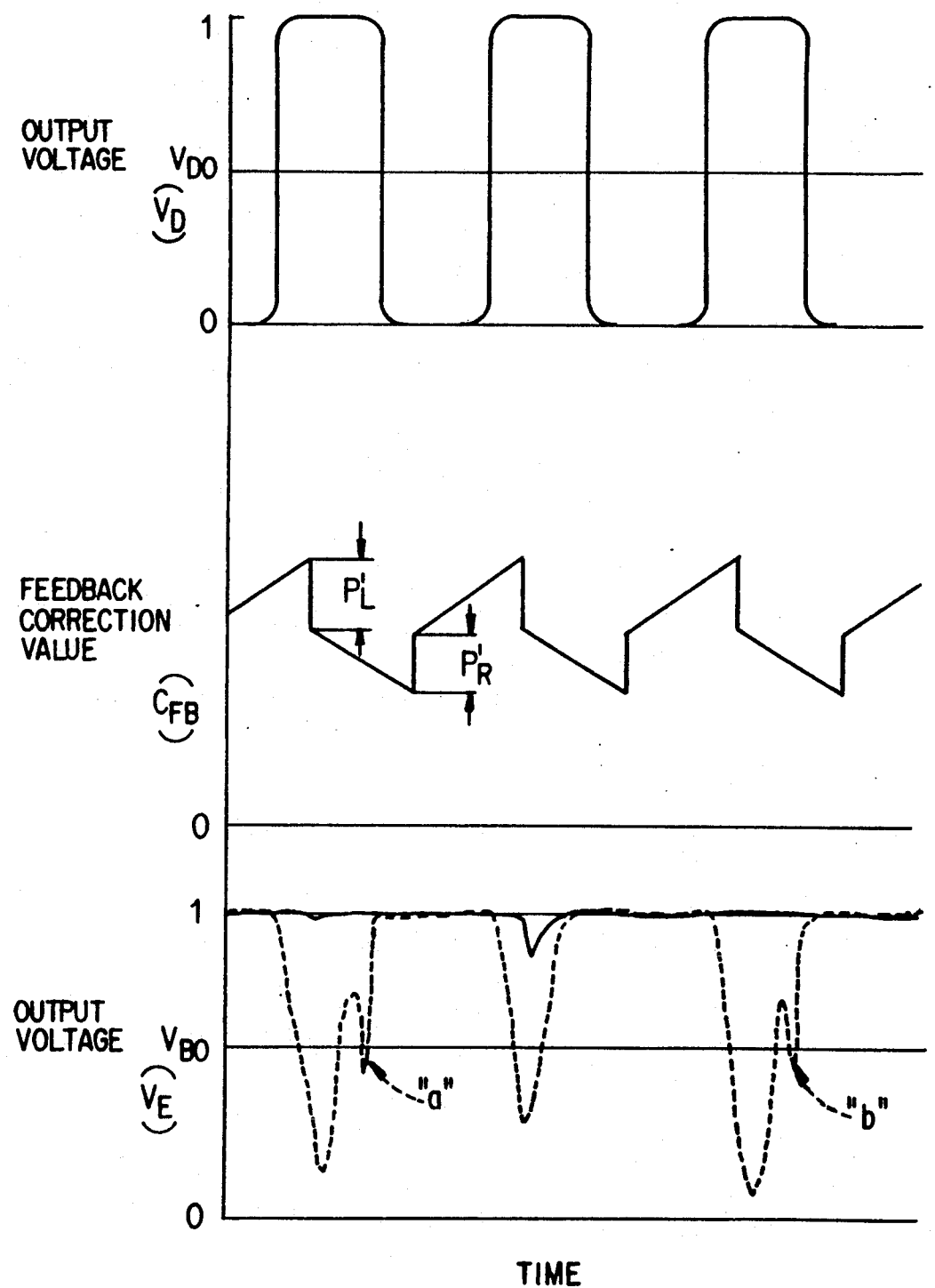
FIG. 4 is a time chart of determining deterioration of a primary catalytic converter.

FIG. 3 is a flow chart of the determination of critical catalytic deterioration. The electronic control unit (ECU) 21 determines whether or not specified engine operating conditions suitable for conducting the determination of critical catalytic deterioration have been realized in accordance with step S1. That is, the determination of catalytic deterioration is conducted only when the engine operating conditions for the air-fuel ratio feedback control have been realized and the engine has attained a specified throttle opening and a specified engine speed. When the answer to the decision made at step S1 is "YES," then, the air-fuel feedback control is conducted for both the left and right banks $1_1$ and $1_2$ based on an output signal SA4 from the D sensor $20_4$ at step S2. As is shown in FIG. 4, when the output signal SA4 of the D sensor $20_4$ indicates a rich air-fuel ratio, a feedback correction value $C_{FB}$ is decreased by a lean skip value $P'_L$, which is used only for determining deterioration of the catalytic converter and is made greater than the ordinary lean skip value $P_L$. On the other hand, when the output signal SA4 of the D sensor $20_4$ indicates a lean air-fuel ratio, a feedback correction value $C_{FB}$ is decreased by a rich skip value $P'_R$, which is used only for determining deterioration of the catalytic converter and is made smaller than the ordinary rich skip value $P_R$.

After establishing and correcting the feedback correction value $C_{FB}$, the electronic control unit (ECU) 21 counts a reversal frequency $N_D$ of the output voltage $V_D$ of the output signal SA4 with respect to the basic voltage $V_{D0}$ from the D sensor $20_4$, and a reversal frequency of the of the output voltage $V_E$ of the output signal SA5 with respect to the basic voltage $V_{E0}$ from the E sensor $20_5$ at step S3. A decision is then made at step S4 as to whether or not the frequency ratio of the reversal frequency $N_E$ to the reversal frequency $N_D$ exceeds a specified ratio $K_1$ for critical deterioration judgement. If the answer to the decision made at step S4 is "YES," then, a decision is made at step S5 as to whether or not critical deterioration has been confirmed. The confirmation of critical catalytic deterioration is considered to be completed when the frequency ratio has exceeded the specified ratio $K_1$ three consecutive times. If the answer to the decision made at step S5 is "YES," then a step S6 is executed to cause the warning lamp 26 to blink. When the answer to the decision made at step S4 is "NO" and when the answer to the decision made at step S5 is "NO," the air-fuel feedback control is conducted, based on output signals SA1 and SA2 from the A sensor $20_1$ and the B sensor $20_2$, individually for the left and right banks $1_1$ and $1_2$ at step S7. During the individual air-fuel feedback control, the electronic control unit (ECU) 21 counts a reversal frequency $N_C$ of the output voltage $V_C$ of the output signal SA3 with respect to the basic voltage $V_{C0}$ from the C sensor $20_3$ and a reversal frequency of the output voltage $V_a$ of the output signal SA1 with respect to the basic voltage $V_{A0}$ from the A sensor $20_5$ at step S8. At step S9, the electronic control unit (ECU) 21 consecutively counts a reversal frequency $N_B$ of the output voltage $V_B$ of the output signal SA2 with respect to the basic voltage $V_{B0}$ from the B sensor $20_2$, and a reversal frequency of the of the output voltage $V_D$ of the output signal SA4 with respect to the basic voltage $V_{D0}$ from the D sensor $20_4$. Then, a decision is made at step S10 as to whether or not the frequency ratio of the reversal frequency $N_C$ to the reversal frequency $N_D$ exceeds a specified ratio $K_2$ for critical deterioration judgement. If the answer to the decision made at step S10 is "YES," then, a decision is made at step S12 as to whether or not critical catalytic deterioration has been confirmed. If the critical deterioration is confirmed, i.e., the answer to the decision made at step S12 is "YES," then a step S13 is executed to cause the warning lamp 26 to blink.

However, when the answer to the decision made at step S10 is "NO," another decision is made at step S11 as to whether or not the frequency ratio of the reversal frequency $N_D$ to the reversal frequency $N_E$ exceeds a specified ratio $K_3$ for critical deterioration judgement. If the answer to the decision made at stp S11 is "YES," then, a decision is made at step S12 as to whether or not critical deterioration has been confirmed. After causing the alarm lamp 26 to blink at either step S6 or step S13, or if there is a "NO" answer to the decision made at step S1, at step S11 or at step S12, the sequence returns to step S1.

Figure 5:
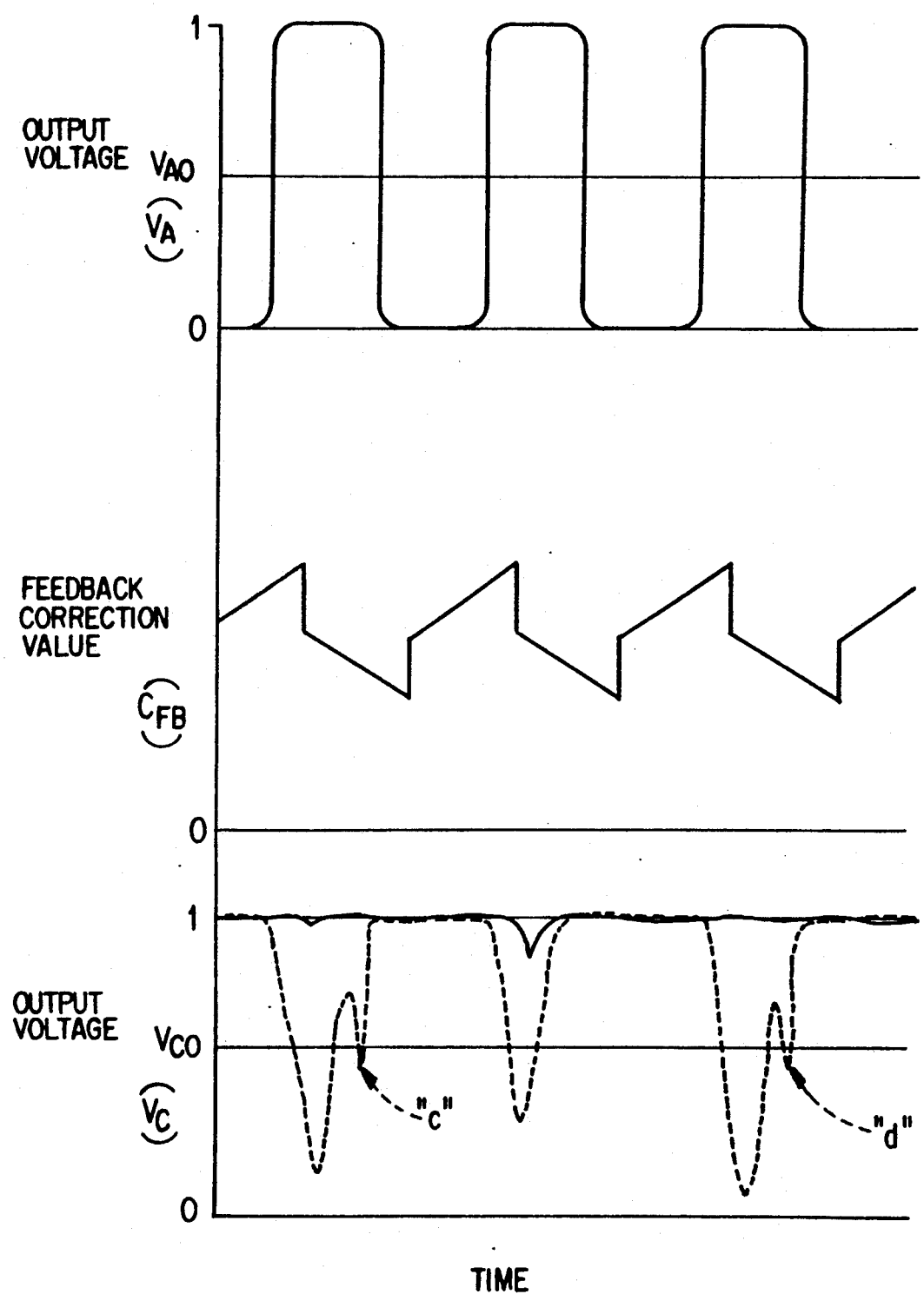
FIG. 5 is a time chart of determining deterioration of a secondary or upstream catalytic converter.

The following explanation is provided with reference to FIGS. 4 and 5 for the purpose of enhancing an understanding of the operation of the exhaust system in accordance with the present invention. When deterioration of the primary catalytic converter 19 is ascertained, the air-fuel ratio feedback control is conducted based on the output signal from the D sensor $20_4$ located downstream from the secondary catalytic converter 18b in the upstream exhaust pipe $16_2$. During the determination of critical deterioration, if the primary catalytic converter 19 is still active, the output voltage $V_E$ of an output signal SA5 from the E sensor, located downstream from the primary catalytic converter 19, changes towards the rich side. The frequency ratio of the reversal frequency $N_E$ of the output signal SA5 from the E sensor $20_5$ to the reversal frequency $N_D$ of the output signal SA4 from the D sensor $20_4$ never exceeds the specified ratio $K_1$. Hence, the primary catalytic converter 19 is not judged to be in a critical state of deterioration. However, if the output voltage $V_E$ of the output signal SA5 from the E sensor $20_5$ reverses more often toward the lean side beyond the basic voltage $V_{E0}$, as shown by broken line, a frequency ratio of the reversal frequency $N_E$ of the output signal SA5 from the E sensor $20_5$ to the reversal frequency $N_D$ of the output signal SA4 from the D sensor $20_4$ exceeds the specified ratio $K_2$ more often, so that the warning lamp 26 blinks. The driver, therefore, is informed of the abnormal condition of the primary catalytic converter when critical deterioration of the catalytic converter is definitely confirmed. In particular, small or short fluctuations of the output voltage $V_E$ of the output signal SA5 from the E sensor $20_5$, tending toward the lean side relative to the basic voltage $V_{E0}$ as shown by "a" and "b," are not counted, thereby controlling errors attributable to noise.

The determination of critical deterioration of the secondary catalytic converters $18_a$ and $18_b$, located in the individual upstream pipes $16_1$ and $16_2$, is conducted based on changes in output voltage of output signals SA3 and SA4 from the C sensor and the D sensor located downstream from the catalytic converters $18a$ and $18b$. The air-fuel ratio feedback control is performed based on output signals SA1 and SA2 from the A sensor and the B sensor individually located upstream from the catalytic converters $18a$ and $18b$, respectively, for the left and right cylinder banks. During this critical deterioration determination, if the primary catalytic converter $18_a$, is still active, the output voltage $V_c$ of an output signal SA3 from the C sensor, located downstream from the secondary catalytic converter $18_a$, changes towards the rich side. The frequency ratio of the reversal frequency $N_c$ of the output signal SA3 from the C sensors $20_3$ to the reversal frequency $N_A$ of the output signal SA1 from the A sensor $20_1$ never exceeds the specified ratio $K_2$. Hence, the secondary catalytic converter is not judged to be in a critical state of deterioration.

If the output signal SA1 from the A sensor, represented by the broken line in FIG. 5, turns more often to the lean side of the basic voltage $V_{C0}$, the frequency ratio of the reversal frequency $N_c$ of the output signal SA3 from the C sensors $20_3$ to reversal frequency $N_A$ of the output signal SA1 from the A sensors $20_1$ passes more often beyond the specified ratio $K_2$. When catalytic deterioration is definitely confirmed, the warning lamp 26 blinks to let the driver know of the abnormal condition of the catalytic converter. Of course, small or short fluctuations of the output voltage $V_c$ of the output signal SA3 from the C sensor $20_3$, tending toward the lean side of the basic voltage $V_{c0}$ as indicated by characters "c" and "d" in FIG. 5, are not counted.

For the catalytic converter 18b, located in the upstream exhaust pipe $16_2$, the determination of deterioration is accomplished by comparing the reversal frequency $N_B$ of the output voltage $V_B$ from the B sensor $20_2$ upstream from the catalytic converter 18b and the reversal frequency $N_D$ of the output voltage $V_D$ from the D sensor $20_4$ downstream from the catalytic converter 18b.

For the catalytic converters 18a and 18b, located in the respective exhaust pipes $16_1$ and $16_2$, the determination of deterioration is executed based on changes in output level of the output signals from the C and D sensors $20_3$ and $20_4$ located downstream from the catalytic converters 18a and 18b, respectively. Consequently, as feedback control is conducted for the respective groups of the cylinders 4, based on emission levels of oxygen detected by the A and B sensors $20_1$ and $20_2$ located upstream from the catalytic converters 18a and 18b, respectively, deterioration of each catalytic converter 18a or 18b is determined with high accuracy.

The exhaust system of this invention may be used in conjunction with such engines as those having two or more separate upstream exhaust pipes as well as a V-type engine.

Figure 6:
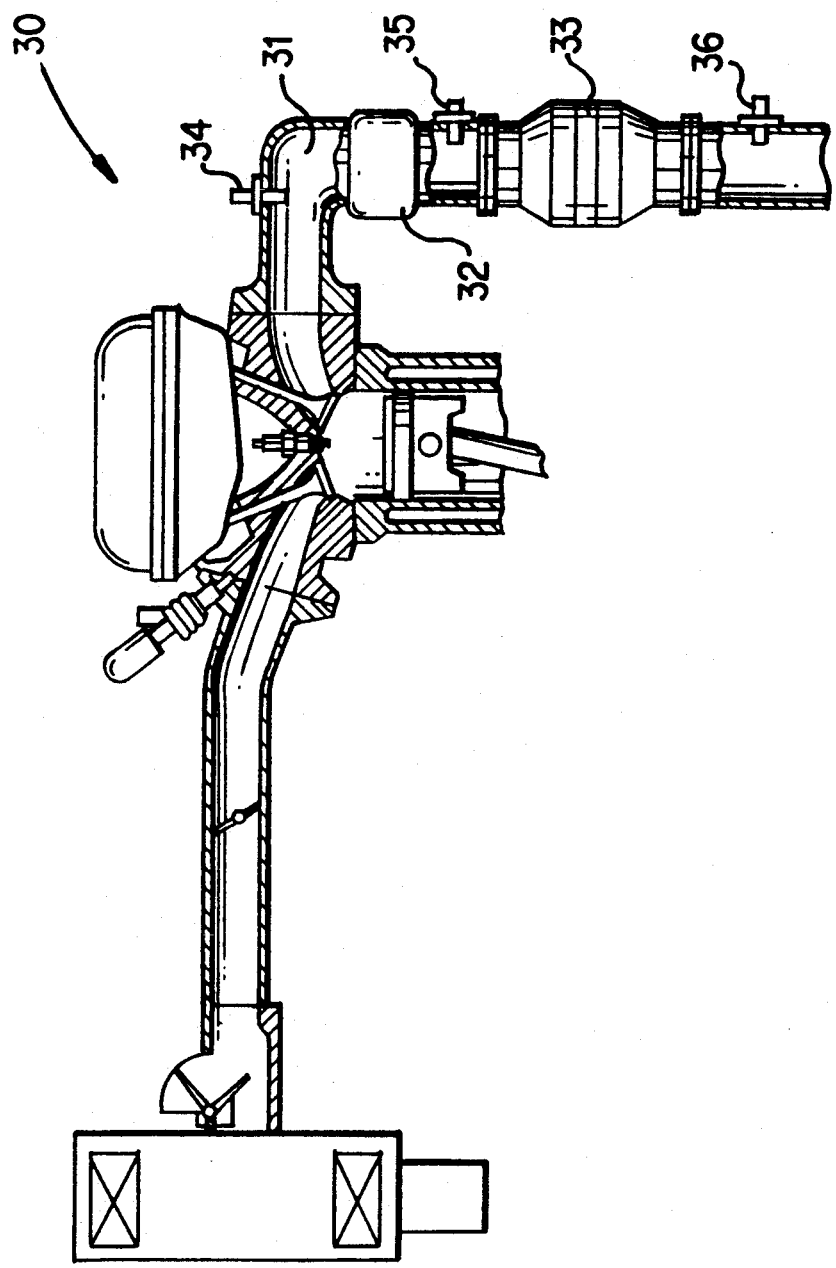
FIG. 6 is a schematic illustration of an in-line type internal combustion engine equipped with an exhaust system in accordance with another preferred embodiment of the present invention.

FIG. 6 shows an in-line internal combustion engine equipped with an exhaust system in accordance with another preferred embodiment of the invention. In this embodiment, there are provided a primary catalytic converter 33 and a secondary catalytic converter 32 arranged in series in a single exhaust pipe 31 connected to an engine 30. In such an arrangement, exhaust sensors 34, 35 and 36 are, respectively, located upstream from the secondary catalytic converter 32, located between the primary and secondary catalytic converters 33 and 32, and located downstream from the primary catalytic converter 33. Deterioration of the primary catalytic converter 33 is detected based on an emission level of oxygen detected by an exhaust sensor 36 located downstream from the catalytic converter 33. Air-fuel ratio feedback control is conducted based on an emission level of oxygen detected by an exhaust sensor 35 located upstream from the catalytic converter 33. Similarly, deterioration of the secondary catalytic converter 32 is detected based on an emission level of oxygen detected by the exhaust sensor 35 located downstream from the catalytic converter 32. Air-fuel ratio feedback control is conducted based on an emission level of oxygen detected by the exhaust sensor 34 located upstream from the catalytic converter 33.

It is to be understood that although preferred embodiments of the present invention have been described in detail, various other embodiments and variants may occur to those skilled in the art. Any such other embodiments and variants which fall within the scope and spirit of the are intended to be covered by the following claims.

What is claimed is:

1. An exhaust system having an exhaust line for a internal combustion engine comprising:
   upstream catalytic converter means, disposed in said exhaust line, for purifying exhaust gas;
   downstream catalytic converter means, disposed downstream from said upstream catalytic converter means in said exhaust line, for purifying exhaust gas;
   a first emission sensor, disposed upstream from said upstream catalytic converter means in said exhaust line, for detecting an emission level of exhaust gas;
   a second emission sensor, disposed between said upstream catalytic converter means and said downstream catalytic converter means in said exhaust line, for detecting an emission level of exhaust gas; and
   a third emission sensor, disposed downstream from said downstream catalytic converter means in said exhaust line, or detecting an emission level of exhaust gas;
   control means for feedback controlling an air-fuel ratio for said engine based on an emission level detected by said first emission sensor, for detecting vehicle operating conditions, for feedback controlling an air-fuel ratio for said engine based on an emission level detected by said second emission sensor only when detecting a specific vehicle operating condition, and for detecting deterioration of said downstream catalytic converter means based on an emission level detected by said third emission sensor while an air fuel ratio is feedback controlled based on said emission level detected by said second emission sensor, thereby determining a critical deterioration of said downstream catalytic converter means.

2. An exhaust system as defined in claim 1, wherein said control means determines a degree of deterioration of said downstream catalytic converter means based on a ratio between reversal frequencies of signals representative of emission levels provided from said second emission sensor and third emission sensor.

3. An exhaust system as defined in claim 2, wherein said control means determines deterioration of said downstream catalytic converter means to be critical when said ratio is determined to be higher than a predetermined value.

4. An exhaust system as defined in claim 3, and further comprising warning means for providing a warning when said control means determines said downstream catalytic converter means to be in critical deterioration.

5. An exhaust system as defined in claim 3, wherein said control means further detects deterioration of said upstream catalytic converter means based on an emission level detected by said second emission sensor while an air fuel ratio is feedback controlled based on said emission level detected by said first emission sensor when a ratio is determined to be lower than a predetermined value, thereby determining a critical deterioration of said upstream catalytic converter means.

6. An exhaust system as defined in claim 5, wherein said control means determines a degree of deterioration of said upstream catalytic converter means based on a ratio between reversal frequencies of signals representative of emission levels provided from said first and second emission sensors.

7. An exhaust system as defined in claim 6, wherein said control means determines deterioration of said upstream catalytic converter means to be critical when said ratio is determined to be higher than another predetermined value.

8. An exhaust system as defined in claim 7, and further comprising warning means for providing a warning when said control means determines said upstream catalytic converter means to be in critical deterioration.

9. An exhaust system for an internal combustion engine having a plurality of cylinders divided, into two groups, each of the groups being independently provided with exhaust lines including an independent upstream exhaust passage connected to each of said two groups of cylinders and a downstream exhaust passage common to each independent upstream exhaust passage, said exhaust system comprising:
   upstream catalytic converter means, disposed in each of said upstream exhaust passage, for purifying exhaust gas;
   downstream catalytic converter means, disposed in said downstream exhaust passage, for purifying exhaust gas;

a first emission sensor, disposed upstream from said upstream catalytic converter means, in each upstream exhaust passage, for detecting an emission level of exhaust gas;

a second emission sensor, disposed between said upstream catalytic converter means and said downstream catalytic converter means in each upstream exhaust passage, for detecting an emission level of exhaust gas;

a third emission sensor, disposed downstream from said downstream catalytic converter means in said downstream exhaust passage, for detecting an emission level of exhaust gas; and control means for feedback controlling air-fuel ratios for said two groups of cylinders independently based on emission levels detected by each first emission sensor, respectively, for detecting vehicle operating conditions, for feedback controlling an air-fuel ratio for said two groups of cylinders based on an emission level detected by said second emission sensor only when detecting a specific vehicle operating condition, and for detecting deterioration of said downstream catalytic converter means based on an emission level detected by said third emission sensor while an air fuel ratio is feedback controlled based on said emission level detected by said second emission sensor, thereby determining a critical deterioration of said downstream catalytic converter means.

* * * * *